(12) United States Patent
Hamano

(10) Patent No.: US 12,550,843 B2
(45) Date of Patent: Feb. 17, 2026

(54) SQUASH PLANT AND METHOD FOR PRODUCING SAME

(71) Applicant: Sakata Seed Corporation, Yokohama (JP)

(72) Inventor: Takeshi Hamano, Yokohama (JP)

(73) Assignee: Sakata Seed Corporation, Yokohama (JP)

( * ) Notice: Subject to any disclaimer, the term of this patent is extended or adjusted under 35 U.S.C. 154(b) by 0 days.

(21) Appl. No.: 18/007,113

(22) PCT Filed: Mar. 18, 2022

(86) PCT No.: PCT/JP2022/012712
§ 371 (c)(1),
(2) Date: Jan. 27, 2023

(87) PCT Pub. No.: WO2022/196801
PCT Pub. Date: Sep. 22, 2022

(65) Prior Publication Data
US 2023/0210078 A1 Jul. 6, 2023

(30) Foreign Application Priority Data
Mar. 18, 2021 (JP) ................. 2021-044448

(51) Int. Cl.
A01H 5/08 (2018.01)
A01H 6/34 (2018.01)
(52) U.S. Cl.
CPC ............... *A01H 6/348* (2018.05); *A01H 5/08* (2013.01)
(58) Field of Classification Search
None
See application file for complete search history.

(56) References Cited

U.S. PATENT DOCUMENTS

| 10,631,493 B2* | 4/2020 | Superak .................. A01H 5/08 |
| 2012/0054893 A1 | 3/2012 | Johnson |
| 2020/0288662 A1 | 9/2020 | Mazet |

FOREIGN PATENT DOCUMENTS

CN 1771790 A 5/2006

OTHER PUBLICATIONS

Uretsky et al., HortScience 48(9) Supplement, NE-ASHS Annual Meeting, Jan. 2-4, 2013, Abstract, published Sep. 1, 2013.*
Examination report No. 1 for standard patent application—AU App 2022239047, dated Mar. 17, 2023, 8 pages.
CPVO (Community Plant Variety Office)—OCVV (Office Communautaire des Varietes Vegetales), 'Protocol for Tests on Distinctness, Uniformity and Stability: Cucurbita Maxima Duch. x Cucurbita Moschata Duch., UPOV Code: CUCUR_MMO', CPVO-TP/311/1, Adopted on Mar. 15, 2017, Entry into force on Jan. 1, 2017 [online], [retrieved from Internet on Mar. 16, 2023], <URL:https://cpvo.europa.eu/sites/default/files/documents/cucurbita_maxima_moschata_2.pdf>, 18 pages.
UPOV (International Union for the Protection of New Varieties of Plants), 'Cucurbita maxima x Cucurbita moschata, UPOV Code: CUCUR_MMO, Cucurbita maxima Duch. x Cucurbita moschata Duch., Guidelines for the Conduct of Tests for Distinctness, Uniformity and Stability', TG/311/1, dated Mar. 25, 2015 [online], [retrieved from internet on Mar. 16, 2023], <URL:https://www.upov.int/edocs/tgdocs/en/tg311.pdf>, 20 pages.
Karaagac, Onur, et al., "Interspecific hybridization and hybrid seed yield of winter squash (*Cucurbita maxima* Duch.) and pumpkin (*Cucurbita Moschata* Duch.) lines for rootstock breeding," Scientia Horticulturae 149 (2013) 9-12, <<http://dx.doi.org/10.1016/j.scienta.2012.10.021>>, Oct. 11, 2011, 4 pages.
Zhang, Qi, et al., "Development of Advanced Interspecific-bridge Lines among Cucurbita pepo, C. maxima, and C. moschata," HortScience 47(4):452-458, Apr. 2012, 7 pages.
Morgan, Dr. Wendy, et al., "Kabocha and Japanese Pumpkin in Australia," A report for the Rural Industries Research and Development Corporation, RIRDC Publication No. 02/167, RIRDC Project No. UCQ-10A, Jun. 2003, 73 pages.
Uretsky, J, et al., Evaluation of Morphological Traits Associated with Productivity in F1 Interspecific (*Cucurbita maxima* Duch. x*C. moschata* Duch.) Hybrid Processing Squash, HortScience, 2017, vol. 52, No. 9.
Keita Sugiyama et al., Breeding and Characteristics of a New Squash Cultivar 'Oitokekuritan' with Short Internodes, Highly Long Storability and Adaptability of Food-processing, National Agriculture and Food Research Organization, Hokkaido Agricultural Research Center, 2019, vol. 208.
May 31, 2022—(WO) International Search Report—App PCT/JP2022/012712.
H. Nerson et al., ISHS Acta Horticulturae 510: VII Eucarpia Meeting on Cucurbit Genetics and Breeding, 2000, DOI:10.17660/ActaHortic.2000.510.36.
Ahmet Balkaya et al., The phenotypic diversity and fruit characterization of winter squash (*Cucurbita maxima*) populations from the Black Sea Region of Turkey, African Journal of Biotechnology vol. 9 (2), Jan. 2010.
Uretsky J., Development and evaluation of interspecific Cucurbita maxima x Cucurbita moschata hybrids for processing squash, 2012, University of New Hampshire, University of New Hampshire Scholars' Repository, Master's Theses and Capstones (2012.05).

(Continued)

*Primary Examiner* — Phuong T Bui
(74) *Attorney, Agent, or Firm* — Banner & Witcoff, Ltd.

(57) ABSTRACT

The present invention provides a squash plant having an especially small seed cavity, and a method for producing the squash plant. The present invention provides a method for producing a small seed cavity squash plant that includes developing, from the progeny of an F1 seed obtained by crossing a *Cucurbita maxima* and a *Cucurbita moschata*, a small seed cavity squash plant in which the proportion of the volume of the seed cavity relative to the fruit volume is 15% or less, and also provides a small seed cavity squash plant that is a small seed cavity *Cucurbita maxima* plant having, within the nuclear genome, a gene associated with a small seed cavity trait of a plant of the genus *Cucurbita*, or a hybrid plant obtained using the small seed cavity *Cucurbita maxima* plant as a parent, or a progeny of either of these plants.

6 Claims, 3 Drawing Sheets

(56) References Cited

OTHER PUBLICATIONS

Dec. 22, 2022 Office Action for KR10-2022-7029905 with Machine translation obtained by Global Dossier on Jan. 11, 2023.
Jan. 27, 2025—(EP) Supplementary Search Report—App EP 22771546.3.

\* cited by examiner

SQUASH PLANT AND METHOD FOR PRODUCING SAME

TECHNICAL FIELD

The present invention relates to a squash plant having the genetic background of *Cucurbita maxima* that exhibits a small proportion for the volume of the seed cavity relative to the total fruit volume, and a method for producing the squash plant.

Priority is claimed on Japanese Patent Application No. 2021-044448, filed Mar. 18, 2021, the content of which is incorporated herein by reference.

BACKGROUND ART

*Cucurbita maxima* is a plant belonging to the Cucurbitaceae family, which was introduced to Japan in the Edo period, and is now widely consumed. Related species of this plant include *Cucurbita moschata* and *Cucurbita pepo*. Both of these species are important crops that are cultivated throughout the world. These species are native to North and South America and spread around the world after Columbus's discovery of the New World, with many cultivars being developed.

In Japan, *Cucurbita moschata* was introduced in the 16th century, with many cultivars being developed throughout the country. Subsequently, *Cucurbita maxima* was introduced in the late Edo period, and this is now the most consumed squash species. *Cucurbita maxima* is superior in terms of taste, shape of the fruit, yield, and ease of cultivation, and much of the squash currently available is either *Cucurbita maxima* or a hybrid thereof. Following the introduction of *Cucurbita maxima*, new cultivars such as Sukuna and Utsugi Akagawa Amaguri squash have been developed in various regions throughout Japan, and many new cultivars have also been developed in seed companies. In Japan, production volumes are particularly large in Hokkaido, which accounts for about 40% of Japan's total production. In terms of imported production, countries such as Mexico, New Zealand and Tonga produce squash for the Japanese off-season.

Squash are nutritionally rich vegetables, and are attracting much attention as healthy vegetables that are rich in vitamins A, C and E. Typically, when squash undergo pollination and bear fruit, the seeds and a fibrous endocarp known as "fibrous strands" are formed in the space surrounding the placenta. The main edible portion of a squash fruit is the fleshy portion, and reducing the size of the seed cavity (the portion containing the seeds, the placenta and the fibrous strands) increases the yield, resulting in less wastage.

However, there has been little research relating to reducing the size of the seed cavity. For example, in the case of *Cucurbita pepo*, it has been reported that the seed cavity represents at least 20% of the entire fruit in many lines, with a minimum value of about 19% (Non-Patent Document 1). In the case of *Cucurbita maxima*, a report exists in which the length of the seed cavity was investigated in various lines (Non-Patent Document 2), but no mention was made of the volume of the seed cavity. Further, for many *Cucurbita maxima* cultivars, evaluations have been reported for traits such as the flesh thickness and the size of the seed cavity. For example, it has been reported that the squash cultivar "Kurihikari" (National Agriculture and Food Research Organization (NARO)), which has the characteristics of a thick flesh portion and small seed cavity, and the squash cultivar "Oitoke Kuritan" (Variety Registration Application No. 32781) exhibit flesh proportions (the percentage of the residual portion obtained following removal of the skin, the seeds and the fibrous strands from the fruit relative to the entire fruit) of 79.3% (by mass) and 77.7% (by mass) respectively (Non-Patent Document 3). However, no values were reported for the actual volume of the seed cavity, or for the proportion of the volume of the seed cavity relative to the total fruit volume.

PRIOR ART LITERATURE

Non-Patent Documents

Non-Patent Document 1: Nerson et al., ISHS Acta Horticulturae 510: VII Eucarpia Meeting on Cucurbit Genetics and Breeding, 2000, DOI:10.17660/ActaHortic.2000.510.36.

Non-Patent Document 2: Balkaya et al., African Journal of Biotechnology, 2010, vol. 9(2), pp. 152 to 162.

Non-Patent Document 3: Sugiyama Keita et al., "Development and characteristics of novel squash variety "Oitoke Kuritan" having short internodes and superior storability and processability", Bulletin of the NARO, Hokkaido Agricultural Research Center, 27 Mar. 2019, No. 208, DOI: 10.24514/00002279.

SUMMARY OF INVENTION

Problems to be Solved by the Invention

The present invention has the objects of providing a squash plant having the genetic background of *Cucurbita maxima*, but having a small proportion of the volume of the seed cavity relative to the total fruit volume, and also providing a method for producing this squash plant. As used herein, the term "seed cavity" refers to the seed cavity of the fruit of a squash plant.

Means for Solving the Problems

The inventors of the present invention conducted research aimed at achieving the above objects, and discovered that by performing interspecific hybridization between *Cucurbita maxima* and *Cucurbita moschata* with a small seed cavity, thereby introducing that trait into *Cucurbita maxima*, and subsequently utilizing backcrossing, a *Cucurbita maxima* line which was practical and had a small seed cavity not seen in conventional *Cucurbita maxima* could be developed, enabling them to complete the present invention.

In other words, the present invention includes the following aspects.

[A] A method for producing a small seed cavity squash plant, the method comprising developing, from a progeny of an F1 seed obtained by crossing a *Cucurbita maxima* and a *Cucurbita moschata*, a small seed cavity squash plant in which a proportion of a volume of a seed cavity relative to a fruit volume is 15% or less.

[B] The method for producing a small seed cavity squash plant according to [A], wherein the *Cucurbita moschata* exhibits a proportion for an area of a seed cavity relative to a fruit volume of less than 13%.

[C] The method for producing a small seed cavity squash plant according to [A] or [B], the method having:
 a step of crossing the *Cucurbita maxima* and the *Cucurbita moschata*, and producing an F1 seed from an obtained fruit, a step of backcrossing a *Cucurbita maxima* plant individual with the F1, and producing a seed from an obtained fruit, a step of cultivating the seed from the fruit obtained from the backcrossing, and following self-pollination, selecting, from among produced fruit, a fruit in which a volume of a seed cavity is equivalent or comparatively small, and then producing a seed from the selected fruit, and a step of repeating self-pollination of seed produced from the selected fruit, thereby developing a small seed cavity squash plant.

[D] A small seed cavity squash plant that is a small seed cavity *Cucurbita maxima* plant having, within a nuclear genome, a gene associated with a small seed cavity trait of a plant of the genus *Cucurbita*, or a hybrid plant obtained using the small seed cavity *Cucurbita maxima* plant as a parent, or a progeny of either of these plants.

[E] The small seed cavity squash plant according to [D], wherein the plant of the genus *Cucurbita* is a *Cucurbita moschata*.

[F] The small seed cavity squash plant according to [D] or [E], wherein the small seed cavity *Cucurbita maxima* is derived from an interspecific hybrid plant of *Cucurbita maxima* and *Cucurbita moschata*.

[G] The small seed cavity squash plant according to any one of [D] to [F], wherein the small seed cavity *Cucurbita maxima* is derived from a plant obtained by crossing a *Cucurbita maxima* and a *Cucurbita moschata*.

[H] The small seed cavity squash plant according to any one of [D] to [G], including a small seed cavity trait derived from a plant specified in accession number FERM BP-22402.

[I] The small seed cavity squash plant according to any one of [D] to [G], including a small seed cavity trait derived from a plant specified in accession number FERM BP-22403.

[J] A small seed cavity squash plant that is a *Cucurbita maxima* plant in which a proportion of a volume of a seed cavity relative to a fruit volume is 15% or less.

[K] A small seed cavity squash plant that is a *Cucurbita maxima* plant in which a quotient of a fruit weight relative to a weight of a seed cavity is 11 or greater.

[L] A small seed cavity squash plant that is a small seed cavity *Cucurbita maxima* plant specified in accession number FERM BP-22402, or a hybrid plant obtained using the small seed cavity *Cucurbita maxima* plant as a parent, or a progeny of either of these plants.

[M] A small seed cavity squash plant that is a small seed cavity *Cucurbita maxima* plant specified in accession number FERM BP-22403, or a hybrid plant obtained using the small seed cavity *Cucurbita maxima* plant as a parent, or a progeny of either of these plants.

[N] A small seed cavity squash plant that is a progeny individual of the small seed cavity squash plant according to [L] or [M].

[O] A portion of a plant body of the small seed cavity squash plant according to any one of [D] to [N].

[P] Fruit of the small seed cavity squash plant according to any one of [D] to [N].

[Q] A seed of the small seed cavity squash plant according to any one of [D] to [N].

[R] A method for producing an F1 seed of a squash plant, the method comprising:

a step of crossing a small seed cavity *Cucurbita maxima* plant and a squash plant other than the small seed cavity *Cucurbita maxima* plant, and a step of producing an F1 seed from an individual obtained from the crossing, wherein the small seed cavity *Cucurbita maxima* plant has a proportion of a volume of a seed cavity relative to a fruit volume that is 15% or less, or has a quotient of a fruit weight relative to a weight of a seed cavity that is 11 or greater.

[S] The method for producing an F1 seed of a squash plant according to [R], wherein the small seed cavity *Cucurbita maxima* plant is the *Cucurbita maxima* plant according to any one of [D] to [N].

[T] A method for producing a small seed cavity plant of the genus *Cucurbita* that expresses a small seed cavity trait, the method comprising consecutively backcrossing an arbitrary plant of the genus *Cucurbita* or an interspecific hybrid plant derived from the plant of the genus *Cucurbita* with the small seed cavity *Cucurbita maxima* plant according to any one of [D] to [N].

[U] A method for producing a small seed cavity *Cucurbita maxima* plant that expresses a small seed cavity trait, the method comprising consecutively backcrossing an arbitrary *Cucurbita maxima* plant or an interspecific hybrid plant derived from the *Cucurbita maxima* plant with the small seed cavity *Cucurbita maxima* plant according to any one of [D] to [N].

Effects of the Invention

The present invention provides a squash plant which yields fruit having a small proportion of the volume of the seed cavity relative to the fruit volume, while still exhibiting the traits of the highly marketable *Cucurbita maxima*.

Further, by using the squash plant according to the present invention as a parent, novel squash lines having a small seed cavity can be produced.

EMBODIMENTS FOR CARRYING OUT THE INVENTION

In the present invention and the present description, the Japanese term "Seiyou kabocha" is translated as *Cucurbita maxima*, the Japanese term "Nihon kabocha" is translated as *Cucurbita moschata*, and the Japanese term "*Pepo* kabocha" is translated as *Cucurbita pepo*.

In the present invention and the present description, the term "seed cavity" is a generic term for the portion containing the squash placenta and the seeds and fibrous strands that exist in the space surrounding the placenta, and means the portion remaining following removal of the skin and the flesh from a squash fruit. In other words, the seed cavity is composed of seeds, fibrous strands (endocarp) and the cavity (placenta).

In the present invention and the present description, the volume of the seed cavity can be determined by subtracting, from the volume of the fruit, the volume of the residual portion (flesh) obtained upon removal of the seeds and fibrous strands from the fruit (namely, [volume of seed cavity ($cm^3$)]=[volume of fruit ($cm^3$)]−[volume of flesh ($cm^3$)]. In a similar manner, the weight of the seed cavity can be determined by subtracting the weight of the flesh from the weight of the fruit (namely, [weight of seed cavity (g)]= [weight of fruit (g)]−[weight of flesh (g)].

The trait that produces fruit having a small proportion of seed cavity volume relative to the fruit volume ([volume of seed cavity ($cm^3$)]/[volume of fruit ($cm^3$)]×100(%)) (hereafter sometimes referred to as "seed cavity/fruit (volume)") is described using the expression "small seed cavity", and a squash having that trait is described as a "small seed cavity squash".

Further, the quotient of the fruit weight relative to the weight of the seed cavity ([weight of fruit (g)]/[weight of seed cavity (g)]) (hereafter sometimes referred to as "fruit/ seed cavity (weight) quotient") may also be used as an indicator of a small seed cavity trait. In a small seed cavity squash, the fruit/seed cavity (weight) quotient is larger than that of a conventional squash having a large seed cavity.

Figure 1:
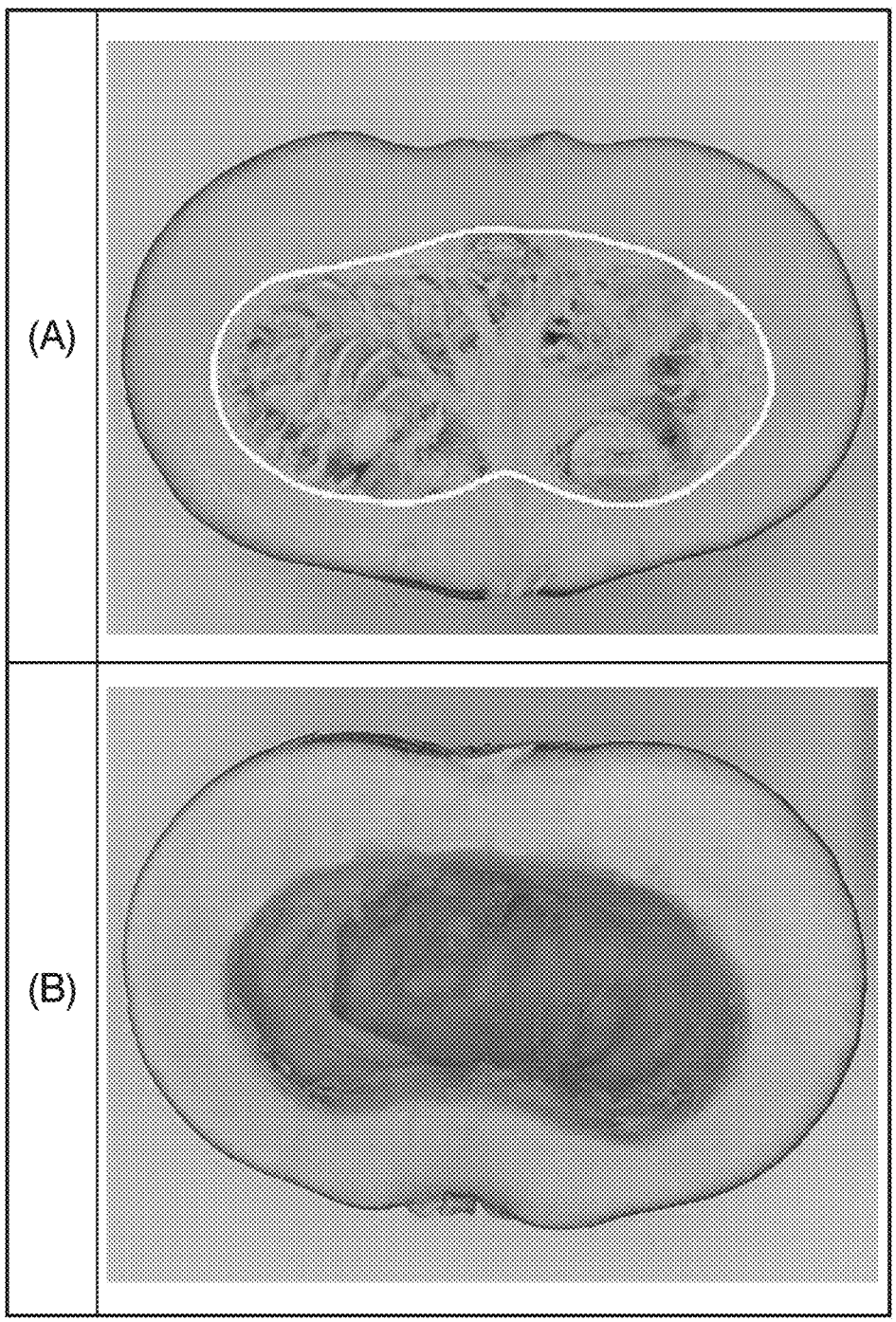
FIG. 1(A) is a photograph of the cross-section of a squash fruit that has been bisected vertically through the peduncle.
FIG. 1(B) is a photograph of the cross-section following removal of seeds from the seed cavity of the fruit of FIG. 1(A).

FIG. 1 shows the seed cavity of a squash fruit. FIG. 1(A) is a photograph of the cross-section of the squash fruit that has been bisected vertically through the peduncle, and FIG. 1(B) is a photograph of the cross-section (of the skin and flesh) following removal of the seed cavity from the fruit of FIG. 1(A). The portion encircled with the white line in FIG. 1(A) is the seed cavity. In the following description, a "cross-section of a squash fruit" refers to a cross-section of the squash fruit that has been bisected vertically through the peduncle.

In the present invention and the present description, the sizes (volumes) of the entire fruit (excluding the) peduncle, the flesh and the seed cavity of a squash fruit can be measured by a method in which the buoyancy is converted to a volume. Specifically, the sizes can be measured using the method disclosed in the examples described below, as illustrated by the outline in FIG. 2.

<Small Seed Cavity *Cucurbita maxima*>

A *Cucurbita maxima* plant according to the present invention is a *Cucurbita maxima* plant that produces fruit having a smaller seed cavity size than that of *Cucurbita maxima*. The *Cucurbita maxima* plant according to the present invention is a plant for which the seed cavity/fruit (by volume) is preferably 15% or less, more preferably at least 3% but not more than 15%, even more preferably at least 3% but less than 13%, and still more preferably at least 3% but less than 9%. Further, the *Cucurbita maxima* plant according to the present invention is a plant for which the fruit/seed cavity (weight) quotient is preferably 11 or greater, more preferably at least 11 but less than 17, even more preferably at least 17 but less than 20, and still more preferably at least 20 but less than 35.

The *Cucurbita maxima* plant according to the present invention exhibits characteristics other than the size of the seed cavity, and particularly those characteristics of a commercially accepted cultivar, which are the same as, or extremely similar to, those of *Cucurbita maxima*. Examples of these characteristics include the taste, fruit shape, yield, and ease of cultivation.

A small seed cavity squash not only offers a higher yield for the edible portion relative to the volume of the entire fruit, but also enables a reduction in the amount of loss due to disposal of the seed cavity. This results in commercial agriculture advantages including improved transport efficiency and reduced loss per unit volume, mainly during the distribution and processing stages following harvesting. In other words, the *Cucurbita maxima* plant according to the present invention is a novel *Cucurbita maxima* plant that has a smaller seed cavity than conventional *Cucurbita maxima*, and offers better transport efficiency and reduced loss per unit volume, while retaining the excellent crop characteristics of *Cucurbita maxima*.

In the present invention and the present description, the expression "portion of the plant body" includes the cells and tissue of the plant body, and specific examples include the fruit, seeds, flowers, pollen, anthers, leaves, stems, roots, embryo, hypocotyl, meristem cells, and callus and the like. In addition, protoplasts obtained from cells of the plant body are also included.

The *Cucurbita maxima* plant according to the present invention can be developed by introducing the small seed cavity trait of a small seed cavity squash other than *Cucurbita maxima* into *Cucurbita maxima*. Introduction of the small seed cavity trait may be achieved, for example, by introducing a gene associated with the small seed cavity trait of a small seed cavity squash (a small seed cavity trait gene) into the nuclear genome of *Cucurbita maxima*. The small seed cavity trait gene within the nuclear genome of the *Cucurbita maxima* plant according to the present invention may be homozygous or heterozygous.

For example, the *Cucurbita maxima* plant according to the present invention is derived from an interspecific hybrid plant of *Cucurbita maxima* and a small seed cavity plant of the genus *Cucurbita* other than *Cucurbita maxima*. Among the interspecific hybrid plants, plant individuals that have inherited the chromosome containing the small seed cavity trait gene of the small seed cavity plant of the genus *Cucurbita* express a small seed cavity trait as a result of that small seed cavity trait gene.

In the present invention and the present description, the term "chromosome" includes not only the entire chromosome, but also portions thereof. In other words, "a portion of a chromosome" may sometimes simply be referred to as "a chromosome".

Interspecific hybrid plants include plants generated as a result of crossing between different species belonging to the same genus (for example, *Cucurbita*), as well as somatic cell hybrid plants generated by interspecific cell fusion of plants of the genus *Cucurbita*, and grafted hybrid plants obtained by interspecific grafting of plants of the genus *Cucurbita*. Further, "plants derived from an interspecific hybrid plant of *Cucurbita maxima* and a small seed cavity plant of the genus *Cucurbita* other than *Cucurbita maxima*" include not only the interspecific hybrid plants mentioned above, but also the progeny of those interspecific hybrid plants. In an individual progeny that has inherited the small seed cavity trait gene from the small seed cavity plant of the genus *Cucurbita*, the existence of that small seed cavity trait gene results in expression of a small seed cavity trait.

In the present invention and the present description, "progeny of a plant of the genus *Cucurbita*" includes descendants obtained by intraspecific crossing of the plant of the genus *Cucurbita*, as well as individuals obtained using the plant of the genus *Cucurbita* as a parent and the descendants thereof, somatic cell hybrid plants obtained by cell fusion of cells of the plant of the genus *Cucurbita* and cells of a plant of a different cultivar and the descendants thereof, and individuals obtained by grafting using the plant of the genus *Cucurbita* as either the stock or the scion and the descendants thereof. The term "descendants" includes both individuals obtained by intraspecific crossing and individuals obtained by interspecific crossing. Further, the expression "individuals obtained using (the plant) as a parent" means individuals obtained by intraspecific crossing, interspecific crossing, cell fusion or grafting, with the plant acting as a parent.

For the small seed cavity plant of the genus *Cucurbita* other than *Cucurbita maxima*, the use of a small seed cavity squash plant of *Cucurbita moschata*, which is a closely related species of *Cucurbita maxima* and can be used to develop interspecific hybrid plants with *Cucurbita maxima*, is preferred. A small seed cavity *Cucurbita maxima* plant having the excellent crop characteristics of *Cucurbita maxima* can be developed from an interspecific hybrid individual of *Cucurbita maxima* and a small seed cavity *Cucurbita moschata* line.

Introduction of a small seed cavity trait gene into the genomic DNA can be performed by cross breeding using *Cucurbita maxima* and a small seed cavity plant of the genus *Cucurbita* as parents, or by genetic modification methods such as genome editing methods.

The small seed cavity trait of the *Cucurbita maxima* plant according to the present invention exhibits semi-dominant expression. Accordingly, by conducting interspecific crossing or intraspecific crossing using the *Cucurbita maxima* plant according to the present invention as a parent, a novel line of small seed cavity squash can be developed.

Examples of the *Cucurbita maxima* plant according to the present invention include the small seed cavity squash line 4183 (accession number FERM BP-22402) and the small seed cavity squash line T00696 (accession number FERM BP-22403). Further, small seed cavity squash plants including a small seed cavity trait derived from a plant specified in accession number FERM BP-22402, and small seed cavity squash plants including a small seed cavity trait derived from a plant specified in accession number FERM BP-22403 are also included within the *Cucurbita maxima* plant according to the present invention.

In the present invention and the present description, a "squash plant including a small seed cavity trait" means a squash plant having a small seed cavity gene. In other words, in one preferred aspect of the present invention, the "small seed cavity squash plant including a small seed cavity trait derived from a plant specified in accession number FERM BP-22402" is not limited to the squash plants specified in accession number FERM BP-22402, but rather includes both the squash plants specified in accession number FERM BP-22402, and squash plants having a small seed cavity trait gene derived from a plant represented by accession number FERM BP-22402. Similarly, the "small seed cavity squash plant including a small seed cavity trait derived from a plant specified in accession number FERM BP-22403" is not limited to the squash plants specified in accession number FERM BP-22403, but rather includes both the squash plants specified in accession number FERM BP-22403, and squash plants having a small seed cavity trait gene derived from a plant represented by accession number FERM BP-22403.

In the present invention and the present description, the term "includes" may be substituted for "has" or "be found". In other words, the terms "includes", "has" and "be found" are used with the same meaning.

The *Cucurbita maxima* plant according to the present invention is preferably a small seed cavity squash plant either specified in accession number FERM BP-22402, or having a small seed cavity trait gene derived from a plant represented by accession number FERM BP-22402. Examples of this small seed cavity squash plant include hybrid plants obtained using the small seed cavity *Cucurbita maxima* plant specified in accession number FERM BP-22402 as a parent, and the progeny of those plants. Further, for the *Cucurbita maxima* plant according to the present invention, a small seed cavity squash plant either specified in accession number FERM BP-22403, or having a small seed cavity trait gene derived from a plant represented by accession number FERM BP-22403 is also preferred. Examples of this small seed cavity squash plant include hybrid plants obtained using the small seed cavity *Cucurbita maxima* plant specified in accession number FERM BP-22403 as a parent, and the progeny of those plants.

<Method for Producing Small Seed Cavity Squash Plant>

A method for producing a small seed cavity squash plant according to the present invention is a method for developing a small seed cavity squash plant having a seed cavity/fruit (volume) proportion of 15% or less from the progeny of an F1 seed obtained by crossing *Cucurbita maxima* and *Cucurbita moschata*. By using a small seed cavity *Cucurbita moschata* as donor material, and conducting interspecific crossing with *Cucurbita maxima* to introduce a small seed cavity trait into the *Cucurbita maxima*, a small seed cavity squash plant having a smaller seed cavity than conventional *Cucurbita maxima* lines can be produced.

In the present invention and the present description, a "production method" is sometimes also called a "development method". In other words, the terms "production" and "development" are used with the same meaning.

In the method for producing a small seed cavity squash plant according to the present invention, a small seed cavity line of *Cucurbita moschata*, which is a closely related species of *Cucurbita maxima*, is used as a parent. As a result, by using the method for producing a small seed cavity squash plant according to the present invention, a novel squash plant in which *Cucurbita maxima* has been imparted with a small seed cavity trait, namely, a novel squash plant which has a smaller seed cavity than conventional *Cucurbita maxima* and improved transport efficiency and reduced loss per unit volume, while retaining the excellent crop characteristics of *Cucurbita maxima*, can be produced.

In the method for producing a small seed cavity squash plant according to the present invention, there are no limitations on the *Cucurbita maxima* used as a parent, but a cultivar that is currently cultivated commercially is preferred. *Cucurbita maxima* cultivars in commercial distribution are mainly large-fruited cultivars and small-fruited cultivars (for example, less than 800 g). The *Cucurbita maxima* used in the present invention is preferably an individual of a *Cucurbita maxima* line which, in typical commercial transactions in Japan, is treated as a large-fruited *Cucurbita maxima* that produces a large fruit for which the weight at harvest is at least 800 g. By using a large-fruited *Cucurbita maxima* line as a parent, a novel *Cucurbita maxima* plant that produces large fruit and has a small seed cavity trait can be more easily created.

In the method for producing a small seed cavity squash plant according to the present invention, the *Cucurbita moschata* used as a parent is a small seed cavity *Cucurbita*

*moschata*. The small seed cavity *Cucurbita moschata* is, for example, preferably an individual of the *Cucurbita moschata* species which, in creeping cultivation with free fruit setting and no trimming in open ground, yields mainly fruit for which the quotient of the cross-sectional area of the seed cavity relative to the cross-sectional area of the fruit ([cross-sectional area of seed cavity $(cm^2)$]/[cross-sectional area of fruit $(cm^2)$]×100(%)) (hereafter sometimes referred to as "seed cavity/fruit (cross-sectional area)" averages less than 13%.

The method for producing a small seed cavity squash plant according to the present invention includes, for example, a step of crossing *Cucurbita maxima* and *Cucurbita moschata*, and extracting an F1 from the obtained fruit, a step of backcrossing a *Cucurbita maxima* plant individual with the F1, and extracting a seed from the obtained fruit, a step of cultivating the seed extracted from the fruit obtained from the backcrossing, and following self-pollination, selecting, from among the obtained fruit, a fruit in which the volume of the seed cavity is equivalent or comparatively small, and then extracting a seed from the selected fruit, and a step of repeating self-pollination of the seed extracted from the selected fruit, thereby developing a small seed cavity squash plant. In these steps, the backcrossing, self-pollination and cultivation may be conducted using typical methods employed in squash cultivation.

It is preferable that the seed extracted from the fruit obtained from backcrossing with the F1 is cultivated, and from among the resulting fruit, a fruit is selected for which the value of seed cavity/fruit (volume) is similar to or smaller than the *Cucurbita maxima* line used as a parent, with a seed then being extracted from that selected fruit. In those cases where there are a plurality of fruit having a small value for seed cavity/fruit (volume), the fruit which has characteristics such as shape, size and color closest to those of *Cucurbita maxima* is preferably selected.

The seed extracted from the fruit obtained from the backcrossing is cultivated, and following self-pollination, a fruit is selected from among the obtained fruit which has a seed cavity volume that is equivalent or comparatively small, and a seed is then extracted from that selected fruit. As a result, the seed of a fruit having characteristics which, with the exception of the small seed cavity trait, are close to *Cucurbita maxima* is obtained. It is preferable that a fruit is selected, from among the fruit obtained following self-pollination, for which the value of seed cavity/fruit (volume) is smaller than that of a fruit from a seed of the cultivar used as a parent, with a seed then being extracted from that selected fruit. In those cases where there are a plurality of fruit having a small value for seed cavity/fruit (volume), the fruit which has characteristics such as shape, size and color closest to those of *Cucurbita maxima* is preferably selected.

Subsequently, by repeating this process of self-pollination of a seed extracted from a selected fruit, a small seed cavity squash plant can be obtained which expresses more stable traits, and in which the germination rate, the fruit yield, and the seed production volume have stabilized as a crop. There are no limitations on the number of repetitions of the self-pollination process, provided the number is at least one, but the number of repetitions may be 2 or 3, or 3 or more.

The small seed cavity *Cucurbita maxima* plant according to the present invention, hybrid plants obtained using that plant as a parent, and progeny of both plants can be used as parents for developing new small seed cavity *Cucurbita maxima* plants. For example, by consecutively backcrossing an arbitrary plant of the genus *Cucurbita* or an interspecific hybrid plant derived from the plant of the genus *Cucurbita* with the small seed cavity *Cucurbita maxima* according to the present invention or the like, a small seed cavity plant of the genus *Cucurbita* that expresses a small seed cavity trait can be produced. Further, by consecutively backcrossing an arbitrary *Cucurbita maxima* plant or an interspecific hybrid plant derived from the *Cucurbita maxima* plant with the small seed cavity *Cucurbita maxima* according to the present invention or the like, a small seed cavity *Cucurbita maxima* plant that expresses a small seed cavity trait can be produced.

<Method for Producing F1 Seed of Squash Plant>

A method for producing an F1 seed of a squash plant according to the present invention includes a step of crossing a small seed cavity *Cucurbita maxima* plant and a squash plant other than the *Cucurbita maxima* plant, and a step of producing an F1 seed from an individual obtained from the crossing. Because the small seed cavity trait of the small seed cavity *Cucurbita maxima* plant has a semi-dominant expression, by interspecific crossing or intraspecific crossing with another squash plant, an F1 seed that yields fruit having the small seed cavity trait can be obtained. The crossing and seed production may be conducted using typical methods.

Examples of the small seed cavity *Cucurbita maxima* plant used as a parent include the small seed cavity squash line 4183 and the small seed cavity squash line T00696. Further, the use of a small seed cavity squash plant produced using the method for producing a small seed cavity squash plant according to the present invention is preferred.

EXAMPLES

Next, the present invention is described in further detail using a series of examples. However, the present invention is not limited to the following examples.

<Measurement of Size (Volume) of Seed Cavity>

Squash volumes were measured for the entire fruit following removal of the peduncle, and the portion remaining following scooping out of the seed cavity from the fruit, and the difference between the two values was deemed to represent the volume of the seed cavity.

The "portion remaining following scooping out of the seed cavity from the fruit" includes the flesh and the skin, but hereafter is referred to as simply the "flesh". In other words, the size of the seed cavity is calculated as [volume of seed cavity $(cm^3)$]=[volume of entire fruit of squash $(cm^3)$]−[volume of flesh $(cm^3)$].

Figure 2:
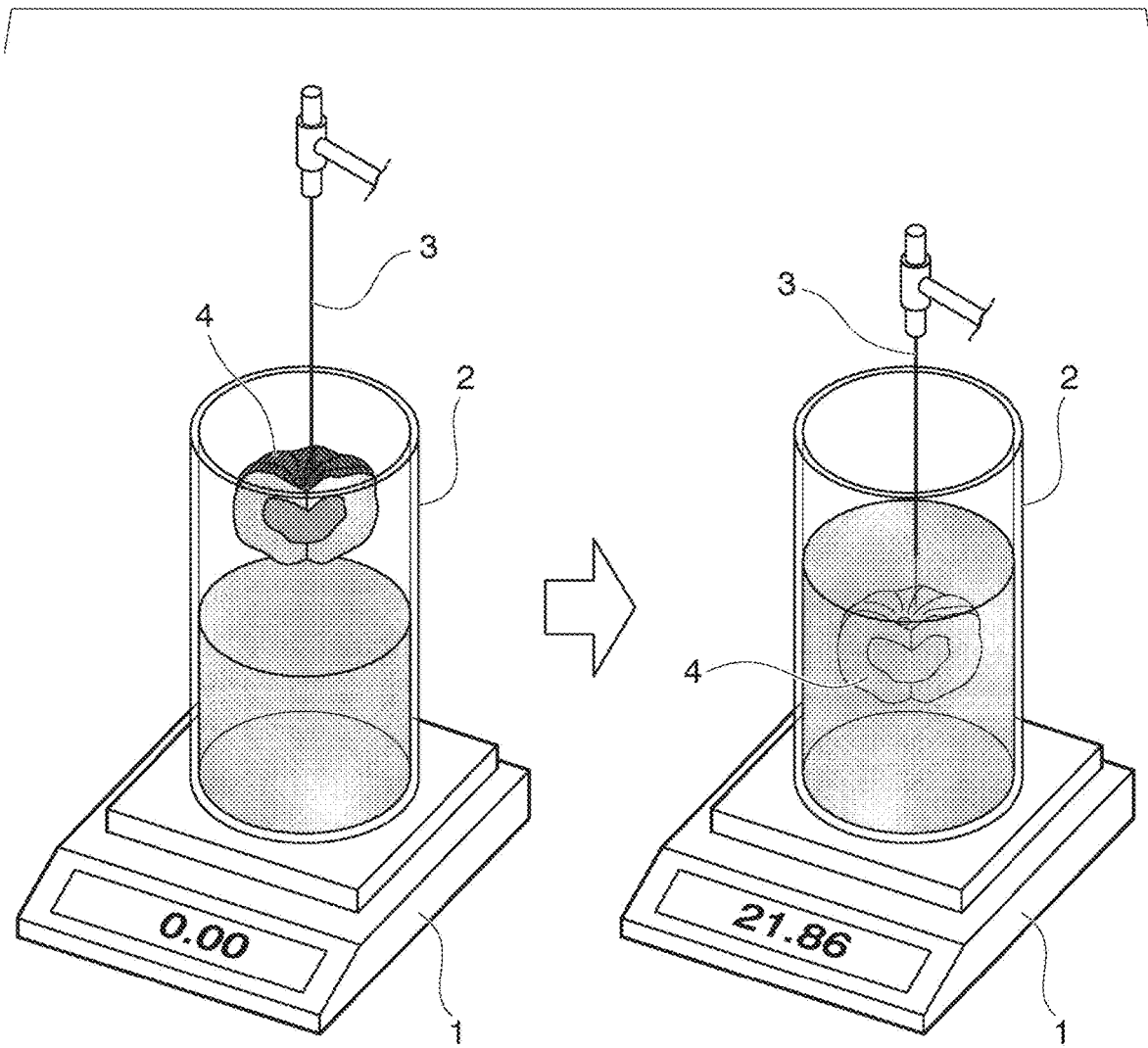
FIG. 2 is a schematic illustration of the method used for measuring the size (volume) of the fruit and the flesh of a squash.

The sizes (volumes) of the fruit and flesh of the squash were measured using a method in which buoyancy was converted to volume. An outline of the measurement is shown in FIG. 2.

Specifically, first, a container 2 containing water was placed on an electronic scale 1, and the display reading was tared to "0 g". Subsequently, a measurement sample 4 supported on a fibrous support member 3 such as a wire was immersed completely in the water inside the container without making contact with the container itself. In this state, the measurement value (g) displayed on the electronic scale 1 is, strictly speaking, the weight (g) of water of an equal volume to the total volume $(cm^3)$ of the measurement sample 4 and the support member 3 immersed in the water inside the container 2, but the volume of the support member 3 is satisfactorily small compared with the volume of the measurement sample 4. As a result, the volume $(cm^3)$ equal to the amount of water of the measurement value (g) displayed on the electronic scale 1 was deemed to indicate the volume $(cm^3)$ of the measurement sample 4.

The "volume of the entire fruit of the squash" is measured by the above measurement method using the fruit prior to cutting as the measurement sample 4. Further, the squash was then bisected vertically through the peduncle, and using each of the bisected fragments following scooping out of the seed cavity as a measurement sample 4, the volume of each bisected fragment was measured in a similar manner, and the total of the measured values for these two bisected fragments was deemed to indicate the "volume of flesh".

<Measurement of Size (Area) of Seed Cavity>

The area of the cross-section of the entire fruit of the squash excluding the peduncle (FIG. 1(A)), and the area of the portion within the cross-section following scooping out of the seed cavity from the fruit (FIG. 1(B)) that was common to the cross-section of the entire fruit of the squash excluding the peduncle (FIG. 1(A)) were each measured. The area of the cross-section of the entire fruit excluding the peduncle was deemed the cross-sectional area of the fruit, and the area obtained by subtracting, from this cross-sectional area of the fruit, the area of the portion common to the cross-section following scooping out of the seed cavity from the fruit was deemed the cross-sectional area of the seed cavity.

Specifically, an image was captured of the cross-section of the squash fruit, the paint tool of a computer or tablet was used to draw a line on the captured image distinguishing the seed cavity region and the flesh region, and a line distinguishing the entire fruit region from the background. Subsequently, image analysis software (such as ImageJ) was used to measure the areas of the entire fruit region and the seed cavity region on the processed image containing the drawn boundary lines.

[Example 1] Development of a Small Seed Cavity Squash Line 4183

A *Cucurbita maxima* line was crossed with a closely related squash species having a small seed cavity, and by repeating open pollination and backcrossing of obtained F1 individuals, a small seed cavity squash line was developed. The *Cucurbita maxima* line 6109 (proprietary to Sakata Seed Corporation) was used as the *Cucurbita maxima* line. The *Cucurbita moschata* line #465, which has a small seed cavity among *Cucurbita moschata* lines which are closely related species to *Cucurbita maxima*, was used as the closely related squash species having a small seed cavity. The value for seed cavity/fruit (area) for the *Cucurbita moschata* line #465 is within a range from 9.0 to 12.8%, and averages about 11.2%.

In 2007, using the *Cucurbita maxima* line 6109 as the seed parent, crossing was conducted using the *Cucurbita moschata* line #465 as the pollen parent. As a result of the crossing, 30.4 g of seeds (about 120 seeds) were produced from a single fruit.

In the following year 2008, upon sowing of all of the obtained seeds, only one individual germinated, and fruit with an intermediate shape between that of the *Cucurbita maxima* and the pollen parent *Cucurbita moschata* was obtained from that individual. Sixteen seeds were able to be obtained from that fruit.

In the following year 2009, sowing of all 16 of these seeds resulted in 15 individuals germinating, on which 14 individuals were transplanted in the field. When crossing was conducted using these 14 individuals as seed parents and using the *Cucurbita maxima* line 8281 (proprietary to Sakata Seed Corporation) as the pollen parent, the shape of the resulting fruit varied from transverse broad elliptical to broad elliptical, and fruit with a comparatively thick flesh were observed. Four fruit individuals were selected from these fruits, and seeds were extracted from each individual fruit, but the number of seeds obtained was between 2 and 36 seeds per fruit, a small number compared with typical *Cucurbita maxima*.

In the following year 2010, from these four individuals, when 24 seeds extracted from a single individual having a transverse broad elliptical and a large thickness of flesh were sown, 17 of these seeds germinated, 16 of these individuals were transplanted, and selected fruit was harvested from 12 individuals. From among these harvested fruit, seeds were extracted from four individuals, including one individual having a deep flesh color, an oval shape and a comparatively thick flesh, and one individual having a small seed cavity.

In the following year 2011, from the seeds obtained the previous year, a final total of 52 plants from the four lines were transplanted, and 12 individual fruit were harvested from one line of these four lines. Among these harvested fruit, only one individual had an extremely small seed cavity. The number of seeds produced from that individual was 76 seeds. The other lines exhibited poor agricultural characteristics, and so were destroyed.

Subsequently, sowing, self-pollination, selection and seed production were repeated, and when the seeds produced from an individual with a good seed production volume were sown in 2013, the fruit derived from the resulting plants were confirmed as having a stable small seed cavity. Planting, self-pollination, selection and seed production was then once again repeated, and in 2015, a line for which the average value for flesh/fruit (volume) [volume of flesh $(cm^3)$]/[volume of fruit $(cm^3)$] exceeded 85% was obtained (small seed cavity squash line 4183).

[Example 2] Development of Squash Small Seed Cavity Line T00696

A squash line different from the *Cucurbita moschata* line used in Example 1 was crossed with a *Cucurbita maxima* line, and by repeating natural crossing and backcrossing from obtained F1 individuals, a squash small seed cavity line was developed. The *Cucurbita maxima* line 6073 (proprietary to Sakata Seed Corporation) was used as the *Cucurbita maxima* line. The *Cucurbita moschata* line 6247, which has a small seed cavity among *Cucurbita moschata* lines, was used as the closely related squash species to *Cucurbita maxima* having a small seed cavity. The value for seed cavity/fruit (area) for the *Cucurbita moschata* line 6247 is within a range from 11.4 to 13.3%, and averages about 12.5%.

The *Cucurbita moschata* line 6247 exhibits different traits from the *Cucurbita moschata* line #465 used in Example 1, not only in terms of the small seed cavity trait, but also in terms of characteristics such as the plant vigor, average fruit weight, skin color, skin pattern, and flesh color and the like, and may be considered a *Cucurbita moschata* with a different genetic background from the *Cucurbita moschata* line #465.

In 2007, using the *Cucurbita maxima* line 6073 as the seed parent, crossing was conducted using the *Cucurbita moschata* line 6247 as the pollen parent. As a result of the crossing, 29.8 g of seeds (about 120 seeds) were produced from a single fruit.

In the following year 2008, upon sowing of all of the obtained seeds, 21 individuals germinated, and all these individuals were transplanted in the field. Using these individuals as seed parents, crossing was conducted using another *Cucurbita maxima* line (proprietary to Sakata Seed Corporation) different from the *Cucurbita maxima* line 6073 as the pollen parent, but did not bear fruit, and 66.0 g of seeds were obtained from the fruit obtained upon natural fruiting.

In the following year 2009, sowing 128 seeds from these 66.0 g of seeds resulted in 24 seeds germinating, of which 16 were transplanted. Crossing was conducted using these 16 plants as seed parents and using the *Cucurbita maxima* line #304 (proprietary to Sakata Seed Corporation) as the pollen parent, and 12 fruit were selected and harvested based on the fruit characteristics. Eight individuals were then selected from among these fruit, yielding between 1 and 49 seeds per individual.

In the following year 2010, three lines were selected from these seeds, and 25 seeds of each line were sown. These three lines were cultivated, and yielded 37 fruit individuals. However, when the inside of the fruit was examined following harvesting, it was found that only individuals having a large seed cavity were obtained from two of the lines, with only the remaining one line yielding fruit with a small seed cavity. Seeds were extracted only from this one line yielding fruit with a small seed cavity, and 4.9 g of seeds (32 seeds) were obtained.

In the following year 2011, all 32 seeds were sown, of which 16 were transplanted, and 10 fruit were harvested. The insides of these harvested fruit were examined, and four individuals were selected for seed extraction. The amount of seed produced was from 6.4 to 19.6 g per fruit. The selected individual lines yielded large numbers of individuals having a small seed cavity.

Subsequently, sowing, self-pollination, selection and seed production were repeated for several years, and in 2015, a line was obtained for which the size of the seed cavity and other characteristics such as the seed productivity had stabilized, enabling a line for which the average value for flesh/fruit (volume) exceeded 85% to be obtained (small seed cavity squash line T00696).

Figure 3:
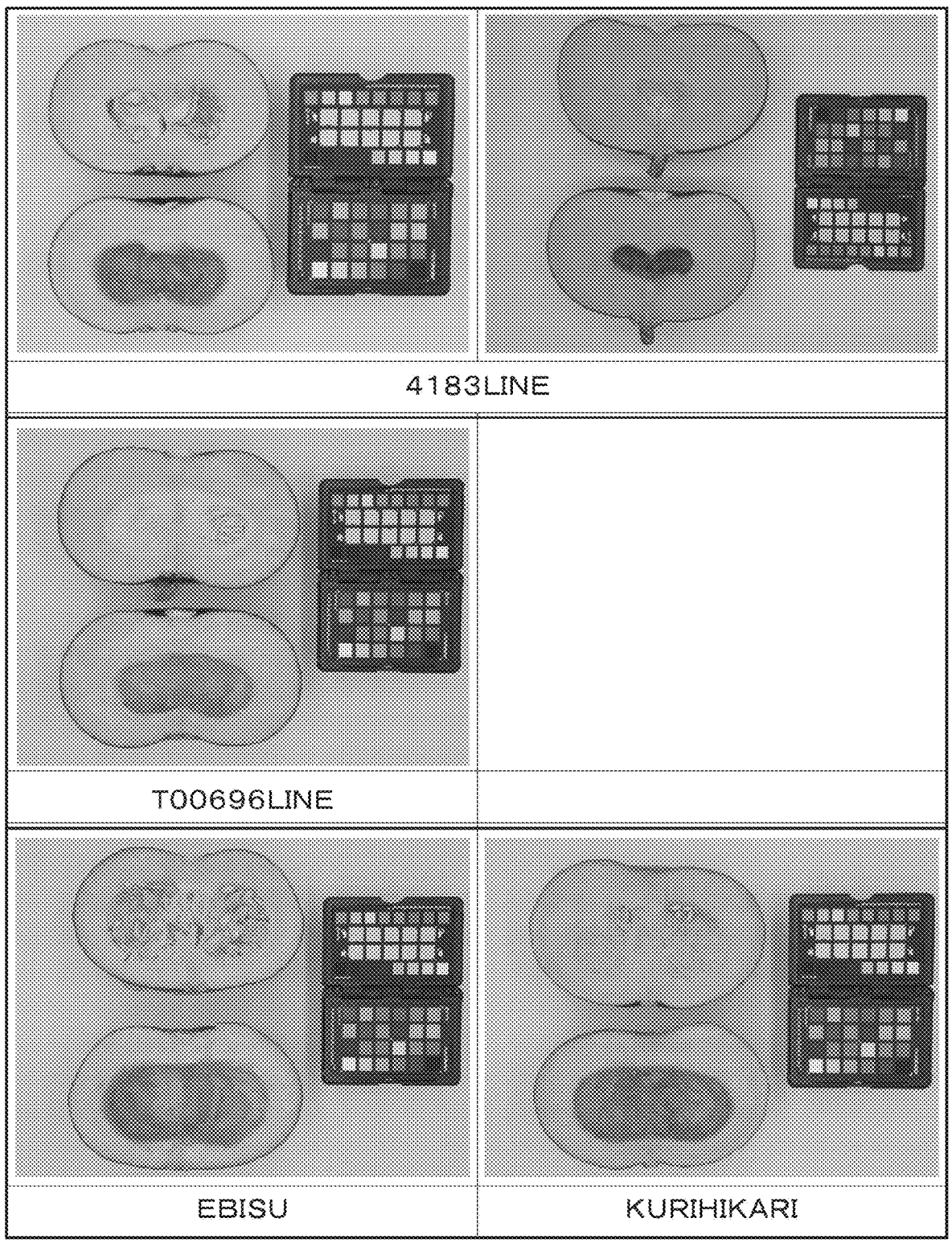
FIG. 3 is a series of photographs of fruit of a small seed cavity squash line 4183, a small seed cavity squash line T00696, the "Ebisu" squash, and the "Kurihikari" squash, showing a cross-section of the fruit that has been bisected vertically through the peduncle, and a cross-section following removal of seeds from the seed cavity of the fruit in each case.

For fruit of the small seed cavity squash line 4183 and the small seed cavity squash line T00696, photographs of the fruit cross-section and the cross-section following removal of the seed cavity from the fruit are shown in FIG. 3. For the small seed cavity squash line 4183, a photograph is also shown for the individual fruit, among all of the fruit obtained for this line, that had the largest value for flesh/fruit (volume) and the smallest seed cavity (the right photograph in the 4183 line row). Photographs for the lines "Ebisu" (Takii & Co., Ltd.) and "Kurihikari" (Watanabe Seed Co., Ltd.), which represent commercially available *Cucurbita maxima* lines having a comparatively small seed cavity, are also shown in FIG. 3.

Test Example 1

The small seed cavity squash lines developed in Example 1 and Example 2 and commercially available *Cucurbita maxima* lines were compared for the size of the seed cavity. The lines "Ebisu" and "Kurihikari" were used as the commercially available *Cucurbita maxima* lines.

The individuals subjected to measurement were cultivated using the cultivation methods and training methods shown in Table 1. Information regarding the lines of the individuals subjected to measurement and the cultivation methods, together with the measurement results, are shown in Table 2. The column labeled "cultivation-training" in Table 2 indicates the method shown in Table 1.

TABLE 1

| | Cultivation method | Training method |
|---|---|---|
| 1 | Ground-trained cultivation | 1 main stem, 1 fruit per plant |
| 2 | Ground-trained cultivation | 2 sub-stems trained, plurality of fruit per plant |
| 3 | Three-dimensional cultivation | 1 main stem trained, 1 to 2 fruits per plant |

TABLE 2

| Test No. | Line name | Cultivation training | Number of fruits measured | Fruit weight [g] | Fruit volume [cm3] | Flesh weight [g] | Flesh volume [cm3] | Flesh volume/ fruit volume [%] | Fruit weight/ seed cavity weight |
|---|---|---|---|---|---|---|---|---|---|
| 1-1-1 | 4183 | 1 | 3 | 1,033 | 1,097 | 976 | 970 | 88 | 18.2 |
| 1-1-2 | | 1 | 12 | 1,375 | 1,473 | 1,287 | 1,277 | 87 | 15.5 |
| 2-1-1 | T00696 | 1 | 4 | 1,990 | 2,175 | 1,883 | 1,860 | 86 | 18.5 |
| P1-1-1 | Ebisu | 1 | 10 | 1,901 | 2,287 | 1,703 | 1,732 | 76 | 9.6 |
| P2-1-1 | Kurihikari | 1 | 8 | 1,988 | 2,220 | 1,770 | 1,763 | 79 | 9.1 |
| 1-2-1 | 4183 | 2 | 6 | 2,330 | 2,517 | 2,216 | 2,255 | 90 | 20.6 |
| 1-2-2 | | 2 | 8 | 2,175 | 2,310 | 2,056 | 2,075 | 90 | 18.2 |
| 1-2-3 | | 2 | 25 | 1,916 | 2,126 | 1,779 | 1,835 | 86 | 14.0 |
| 1-2-4 | | 2 | 14 | 1,785 | 1,874 | 1,685 | 1,694 | 90 | 17.8 |
| 1-2-5 | | 2 | 9 | 1,850 | 1,955 | 1,753 | 1,776 | 91 | 18.9 |
| 1-3-1 | | 3 | 12 | 1,228 | 1,325 | 1,124 | 1,132 | 85 | 11.7 |
| 1-3-2 | | 3 | 14 | 1,266 | 1,378 | 1,171 | 1,185 | 86 | 13.2 |
| 1-3-3 | | 3 | 9 | 1,054 | 1,120 | 968 | 958 | 86 | 12.2 |
| 1-3-4 | | 3 | 13 | 1,331 | 1,456 | 1,215 | 1,234 | 85 | 11.5 |
| 1-3-5 | | 3 | 11 | 1,312 | 1,407 | 1,214 | 1,211 | 86 | 13.4 |

When cultivation was conducted using the cultivation-training method 1, the commercially available cultivars Ebisu (Test P1-1-1) and Kurihikari (Test P2-1-1) each yielded a value for flesh/fruit (volume) ([flesh volume $(cm^3)$]/[fruit volume $(cm^3)$]) of less than 80%, whereas the line 4183 developed in Example 1 (Test 1-1-1 and Test 1-1-2) and the line T00696 developed in Example 2 (Test 2-1-1) each yielded a value for flesh/fruit (volume) of 85% or higher (namely, a value for seed cavity/fruit (volume) of 15% or less), indicating squash having a small seed cavity and a large amount of flesh. Further, the fruit/seed cavity (weight) ([fruit weight (g)]/[seed cavity weight (g)]) quotient was less than 10 for each of the lines Ebisu (Test P1-1-1) and Kurihikari (Test P2-1-1), but was significantly larger at 15 or greater for both the line 4183 (Test 1-1-1 and Test 1-1-2) and the line T00696 (Test 2-1-1). Further, Test 1-2-1 to Test 1-2-5, and Test 1-3-1 to Test 1-3-5 each yielded a value for flesh/fruit (volume) of 85% or higher, and a large value for fruit/seed cavity (weight) quotient of 11 or greater. These results confirmed that the small seed cavity squash line 4183 was able to produce fruit having a small seed cavity regardless of the cultivation method and training method.

The small seed cavity squash line 4183 and the small seed cavity squash line T00696 are excellent new cultivars having a small seed cavity while retaining the favorable characteristics of *Cucurbita maxima*. Accordingly, the applicants of the present invention have deposited seeds of these lines in the National Institute of Technology and Evaluation (NITE) International Patent Organism Depositary (2-5-8 Kazusakamatari, Kisarazu-shi, Chiba). The identification code appended to the small seed cavity squash line 4183 by the depositor is SSC-SQU-20-001, and the accession number is FERM BP-22402 (accession date: 1 Dec. 2020), whereas the identification code appended to the small seed cavity squash line T00696 by the depositor is SSC-SQU-20-002, and the accession number is FERM BP-22403 (accession date: 8 Dec. 2020).

[Example 3] Crossing of Small Seed Cavity Squash Lines and Conventional Lines

The small seed cavity squash lines obtained in Examples 1 and 2 were crossed with *Cucurbita maxima* lines having seed cavity sizes that were typical or slightly large (typical line A and typical line B), and the resulting fruit (F1) were examined for volume of the entire fruit excluding the peduncle and the volume of the seed cavity, which were then compared with the parent lines. The measurement results are shown in Table 3.

exhibited larger values than the typical line B for both flesh/fruit (volume) and fruit/seed cavity (weight) quotient. These results indicated that the small seed cavity trait exhibited by the line 4183 and the line T00696 is inherited in a semi-dominant manner, and it is thought that by using these small seed cavity squash lines, new small seed cavity squash lines will be able to be developed.

[Comparative Example 1] Rearing a Small Seed Cavity Squash Line without Using Interspecific Crossing Creation of a line having a small seed cavity was attempted by repeatedly selecting individuals having a small seed cavity from fruit obtained by natural intraspecific crossing of *Cucurbita maxima*.

In 2005, seeds extracted from the fruit of an F1 squash (*Cucurbita maxima*) (proprietary to Sakata Seed Corporation) were sown, of which 20 plants were transplanted, and cultivation was conducted in an open field. The fruit of 10 individuals were selected and harvested from among the fruit produced as a result of the cultivation. The inside of this harvested fruit was examined, a single individual having a smaller seed cavity than the fruit of the parent individual was confirmed, and seeds were extracted from this individual.

In the following year 2006, the extracted seeds were sown, of which 20 plants were transplanted, and fruit was selected from 7 of these plants. Among these selected individuals, some variation was observed in terms of skin color and fruit shape, but the seed cavity was smaller in all of the individuals.

Subsequently, sowing, self-pollination, selection and seed production were repeated, and in 2010, the development of a line having a small seed cavity (typical line C) was completed.

In 2020, fruit of this typical line C was measured for volume of the entire fruit and the flesh portion, as well as other measurements, and the size of the seed cavity was compared. The measurement results are shown in Table 4. The results showed that although the typical line C developed by natural crossing and fruit selection of the progeny

TABLE 3

| Name of line | Cultivation-training | Number of fruits measured | Fruit weight [g] | Fruit volume [cm3] | Flesh weight [g] | Flesh volume [cm3] | Flesh volume/fruit volume [%] | Fruit weight/seed cavity weight |
|---|---|---|---|---|---|---|---|---|
| Typical line A | 1 | 6 | 1,515 | 1,715 | 1,348 | 1,303 | 76 | 9.1 |
| F1 of typical line A and 4183 | 1 | 7 | 1,753 | 1,906 | 1,578 | 1,546 | 81 | 10.0 |
| Typical line B | 1 | 9 | 1,295 | 1,540 | 1,146 | 1,176 | 76 | 8.7 |
| F1 of typical line B and 4183 | 1 | 10 | 2,020 | 2,373 | 1,820 | 1,861 | 78 | 10.1 |

The fruit of the crossed individual (F1) of the typical line A and the line 4183 exhibited larger values than the typical line A for both flesh/fruit (volume) and fruit/seed cavity (weight) quotient, but did not reach the values observed for the fruit of the line 4183. Similarly, the fruit of the crossed individual (F1) of the typical line B and the line T00696 using the size of the seed cavity as an indicator had a smaller seed cavity than commercially available *Cucurbita maxima* lines, the flesh/fruit (volume) was 80.2%, which did not reach the values achieved for the small seed cavity squash lines developed in Examples 1 and 2.

TABLE 4

| Line name | Cultivation-training | Number of fruits measured | Fruit weight [g] | Fruit volume [cm3] | Flesh weight [g] | Flesh volume [cm3] | Flesh volume/ fruit volume [%] | Fruit weight/ seed cavity weight |
|---|---|---|---|---|---|---|---|---|
| Typical line C | 1 | 10 | 1,483 | 1,608 | 1,292 | 1,289 | 80 | 7.8 |

Comparative Example 2

Using the above typical line C of *Cucurbita maxima* (proprietary to Sakata Seed Corporation) as the seed parent, crossing was conducted using a *Cucurbita moschata* line D (proprietary to Sakata Seed Corporation) having a seed cavity size from typical to slightly large among *Cucurbita moschata* lines as the pollen parent. As a result of the crossing, seeds (F1) were extracted from one fruit. The process of sowing the obtained F1 seeds and then backcrossing with the *Cucurbita maxima* line was conducted twice, and self-pollination of the subsequently obtained seeds was repeated. The size of the seed cavity of each fruit was evaluated visually using a 5-step scale (where 1 is the smallest and 5 is the largest). The results are shown in Table 5. As a comparative reference, the measurement results for the small seed cavity squash line 4183 developed in Example 1 are also shown.

Using the typical line #360 of *Cucurbita maxima* (proprietary to Sakata Seed Corporation) as the seed parent, crossing was conducted using a *Cucurbita moschata* line E (proprietary to Sakata Seed Corporation) having a seed cavity size from typical to slightly large among *Cucurbita moschata* lines as the pollen parent. As a result of the crossing, seeds (F1) were extracted from one fruit. The process of sowing the obtained F1 seeds and then backcrossing with the *Cucurbita maxima* line was conducted twice, and self-pollination of the subsequently obtained seeds was repeated. The size of the seed cavity of each fruit was evaluated visually using a 5-step scale (where 1 is the smallest and 5 is the largest). The results are shown in Table 5.

Using the typical line #228 of *Cucurbita maxima* (proprietary to Sakata Seed Corporation) as the seed parent, crossing was conducted using a *Cucurbita moschata* line F (proprietary to Sakata Seed Corporation) having a seed cavity size from typical to slightly large among *Cucurbita moschata* lines as the pollen parent. As a result of the crossing, seeds (F1) were extracted from one fruit. The process of sowing the obtained F1 seeds and then backcrossing with the *Cucurbita maxima* line was conducted twice, and self-pollination of the subsequently obtained seeds was repeated. The size of the seed cavity of each fruit was evaluated visually using a 5-step scale (where 1 is the smallest and 5 is the largest). The results are shown in Table 5.

TABLE 5

| | Number of plants | Number of fruits harvested | Number of fruits of seed cavity size checked | Seed cavity size (average) |
|---|---|---|---|---|
| Line 4183 | 17 | 9 | 9 | 1.0 |
| Crossing with line D | | | | |
| Interspecific hybrid F1 | | | | |
| First backcrossing | 14 | 12 | 12 | 4.0 |
| Second backcrossing | 20 | 8 | 2 | 2.5 |
| Backcrossing twice, then self-pollination once | 14 | 5 | 3 | 3.3 |
| Backcrossing twice, then self-pollination twice | 14 | 3 | 3 | 4.3 |
| Crossing with line E | | | | |
| Interspecific hybrid F1 | | | | |
| First backcrossing | 14 | 8 | 8 | 3.3 |
| Second backcrossing | 43 | 18 | 18 | 4.1 |
| Backcrossing twice, then self-pollination once | 14 | 1 | 1 | 4.0 |
| Crossing with line F | | | | |
| Interspecific hybrid F1 | | | | |
| First backcrossing | — | — | — | — |
| Second backcrossing | 4 | 4 | 3 | 4.5 |
| Backcrossing twice, then self-pollination once | 18 | 16 | 8 | 4.1 |
| Backcrossing twice, then self-pollination twice | 12 | 4 | 3 | 4.0 |
| Backcrossing twice, then self-pollination three times | 24 | 54 | 15 | 4.3 |
| Backcrossing twice, then self-pollination four times | 14 | 12 | 1 | 5.0 |

The results revealed that in the hybrids produced by crossing with the *Cucurbita moschata* line D, the generation of the second backcrossing had a smaller seed cavity than the generation of the first backcrossing, but subsequent self-pollination caused the seed cavity to increase in size, and the hybrid was eliminated by the generation of the second self-pollination following backcrossing. In the case of the hybrids produced by crossing with the *Cucurbita moschata* line E, no improvement in the size of the seed cavity was observed, and the hybrid was eliminated by the generation of the first self-pollination following backcrossing. Similarly, in the case of the hybrids produced by crossing with the *Cucurbita moschata* line F, no improvement in the size of the seed cavity was observed, and the hybrid was eliminated by the generation of the fourth self-pollination following backcrossing. These results revealed that in those cases where the *Cucurbita moschata* crossed with the *Cucurbita maxima* is a line having a seed cavity size that is from equivalent to slightly large, a squash line having a small seed cavity size cannot be developed, and that in order to develop a line having a small seed cavity size, it is necessary to cross a *Cucurbita moschata* line having a small seed cavity size with the *Cucurbita maxima*.

DESCRIPTION OF THE REFERENCE SIGNS

1: Electronic scale
2: Container
3: Fibrous support member
4: Measurement sample

ACCESSION NUMBERS

FERM BP-22402
FERM BP-22403

The invention claimed is:

1. A small seed cavity *Cucurbita maxima* squash plant including a small seed cavity trait in which the volume of seed cavity relative to fruit volume is 15% or less, and
   wherein the small seed cavity *Cucurbita maxima* squash plant is the small seed cavity *Cucurbita maxima* squash plant, representative seeds of which have been deposited under accession number FERM BP-22402,
   or a hybrid plant including the small seed cavity trait which is obtained from the small seed cavity *Cucurbita maxima* squash plant, representative seeds of which have been deposited under accession number FERM BP-22402 as a parent,
   or a progeny plant of either of these plants which includes the small seed cavity trait.

2. The small seed cavity *Cucurbita maxima* squash plant according to claim 1, wherein the small seed cavity *Cucurbita maxima* plant is obtained from an interspecific hybrid plant of a *Cucurbita maxima* plant and a *Cucurbita moschata* plant.

3. The small seed cavity *Cucurbita maxima* squash plant according to claim 1, wherein the quotient of the fruit weight relative to the weight of the seed cavity is 11 or greater, and
   wherein the weight of the seed cavity can be determined by subtracting the weight of the flesh from the weight of the fruit.

4. A portion of the plant body of the small seed cavity *Cucurbita maxima* squash plant, representative seeds of the small seed cavity *Cucurbita maxima* squash plant having been deposited under accession number FERM BP-22402, wherein the portion produces a small seed cavity *Cucurbita maxima* squash plant including a small seed cavity trait in which the volume of seed cavity relative to fruit volume is 15% or less.

5. Fruit of the small seed cavity *Cucurbita maxima* squash plant according to claim 1, or of the hybrid plant or progeny plant thereof in which the proportion of the volume of the seed cavity relative to the fruit volume is 15% or less.

6. A seed of a small seed cavity *Cucurbita maxima* squash plant, wherein representative seeds of the small seed cavity *Cucurbita maxima* squash plant have been deposited under accession number FERM BP-22402, and wherein the seed produces a small seed cavity *Cucurbita maxima* squash plant including a small seed cavity trait in which the volume of seed cavity relative to fruit volume is 15% or less.

* * * * *